(12) United States Patent
Marsousi et al.

(10) Patent No.: US 12,024,161 B2
(45) Date of Patent: Jul. 2, 2024

(54) VEHICULAR CONTROL SYSTEM

(71) Applicant: Magna Electronics Inc., Auburn Hills, MI (US)

(72) Inventors: Mahdi Marsousi, Maple (CA); Harold E. Joseph, Brampton (CA); Nikhil Gupta, Brampton (CA); Alexander Velichko, Toronto (CA)

(73) Assignee: Magna Electronics Inc., Auburn Hills, MI (US)

( * ) Notice: Subject to any disclaimer, the term of this patent is extended or adjusted under 35 U.S.C. 154(b) by 0 days.

(21) Appl. No.: 18/464,373

(22) Filed: Sep. 11, 2023

(65) Prior Publication Data

US 2023/0415729 A1    Dec. 28, 2023

Related U.S. Application Data

(62) Division of application No. 17/663,221, filed on May 13, 2022, now Pat. No. 11,753,002, which is a division of application No. 16/738,561, filed on Jan. 9, 2020, now Pat. No. 11,332,124.

(60) Provisional application No. 62/796,715, filed on Jan. 25, 2019, provisional application No. 62/790,495, filed on Jan. 10, 2019.

(51) Int. Cl.
| | | |
|---|---|---|
| *B60W 30/06* | (2006.01) | |
| *G05D 1/00* | (2006.01) | |
| *G06V 20/58* | (2022.01) | |
| *G08G 1/14* | (2006.01) | |
| *G08G 1/16* | (2006.01) | |

(52) U.S. Cl.
CPC .......... *B60W 30/06* (2013.01); *G05D 1/0255* (2013.01); *G05D 1/0257* (2013.01); *G06V 20/586* (2022.01); *G08G 1/143* (2013.01); *G08G 1/168* (2013.01)

(58) Field of Classification Search
CPC ........ G01S 13/867; G01S 2013/93271; G06V 20/58; G06V 20/56; G06V 20/586; G05D 1/246; G06T 2207/30252; B60W 2420/403
See application file for complete search history.

(56) References Cited

U.S. PATENT DOCUMENTS

| | | |
|---|---|---|
| 6,587,186 B2 | 7/2003 | Bamji et al. |
| 6,674,895 B2 | 1/2004 | Rafii et al. |
| 6,678,039 B2 | 1/2004 | Charbon |
| 6,690,268 B2 | 2/2004 | Schofield et al. |
| 6,690,354 B2 | 2/2004 | Sze |

(Continued)

*Primary Examiner* — Kenneth J Malkowski
(74) *Attorney, Agent, or Firm* — HONIGMAN LLP

(57) ABSTRACT

A vehicular control system includes a plurality of sensors disposed at a vehicle so as to have a combined field of sensing forward, rearward and sideward of the vehicle. Data captured by the sensors as the vehicle moves along a road is processed at a control for detecting objects present exterior the vehicle. The control designates a plurality of locations within the fields of sensing. As the vehicle moves along the road, the control increases a value for each designated location when an object is detected at that designated location, and decreases the value for each designated location when an object is not detected at that designated location, and generates an object map based on values for the designated locations. The greater the value for a particular designated location, the greater the probability an object is present at that particular designated location.

15 Claims, 8 Drawing Sheets

(56) References Cited

U.S. PATENT DOCUMENTS

| | | |
|---|---|---|
| 6,693,517 B2 | 2/2004 | McCarthy et al. |
| 6,710,770 B2 | 3/2004 | Tomasi et al. |
| 6,876,775 B2 | 4/2005 | Torunoglu |
| 6,906,793 B2 | 6/2005 | Bamji et al. |
| 6,919,549 B2 | 7/2005 | Bamji et al. |
| 7,038,577 B2 | 5/2006 | Pawlicki et al. |
| 7,053,357 B2 | 5/2006 | Schwarte |
| 7,157,685 B2 | 1/2007 | Bamji et al. |
| 7,176,438 B2 | 2/2007 | Bamji et al. |
| 7,203,356 B2 | 4/2007 | Gokturk et al. |
| 7,212,663 B2 | 5/2007 | Tomasi |
| 7,283,213 B2 | 10/2007 | O'Connor et al. |
| 7,310,431 B2 | 12/2007 | Gokturk et al. |
| 7,321,111 B2 | 1/2008 | Bamji et al. |
| 7,340,077 B2 | 3/2008 | Gokturk et al. |
| 7,352,454 B2 | 4/2008 | Bamji et al. |
| 7,375,803 B1 | 5/2008 | Bamji |
| 7,379,100 B2 | 5/2008 | Gokturk et al. |
| 7,379,163 B2 | 5/2008 | Rafii et al. |
| 7,405,812 B1 | 7/2008 | Bamji |
| 7,408,627 B2 | 8/2008 | Bamji et al. |
| 7,498,972 B2 | 3/2009 | Tanaka |
| 7,580,795 B2 | 8/2009 | McCarthy et al. |
| 7,720,580 B2 | 5/2010 | Higgins-Luthman |
| 7,855,755 B2 | 12/2010 | Weller et al. |
| 8,013,780 B2 | 9/2011 | Lynam |
| 8,027,029 B2 | 9/2011 | Lu et al. |
| 8,874,317 B2 | 10/2014 | Marczok et al. |
| 9,036,026 B2 | 5/2015 | Dellantoni et al. |
| 9,146,898 B2 | 9/2015 | Ihlenburg et al. |
| 9,205,776 B2 | 12/2015 | Turk |
| 9,575,160 B1 | 2/2017 | Davis et al. |
| 9,599,702 B1 | 3/2017 | Bordes et al. |
| 9,689,967 B1 | 6/2017 | Stark et al. |
| 9,753,121 B1 | 9/2017 | Davis et al. |
| 10,078,789 B2 | 9/2018 | Gupta et al. |
| 10,086,870 B2 | 10/2018 | Gieseke et al. |
| 10,214,206 B2 | 2/2019 | Latotzki |
| 10,222,224 B2 | 3/2019 | Johnson et al. |
| 10,328,932 B2 | 6/2019 | Gieseke et al. |
| 11,332,124 B2 | 5/2022 | Marsousi et al. |
| 11,753,002 B2 | 9/2023 | Marsousi et al. |
| 2009/0228204 A1* | 9/2009 | Zavoli ............... G01C 21/30 701/532 |
| 2010/0245066 A1 | 9/2010 | Sarioglu et al. |
| 2012/0062743 A1 | 3/2012 | Lynam et al. |
| 2012/0218412 A1 | 8/2012 | Dellantoni et al. |
| 2013/0222592 A1 | 8/2013 | Gieseke |
| 2014/0218529 A1 | 8/2014 | Mahmoud et al. |
| 2014/0375476 A1 | 12/2014 | Johnson et al. |
| 2015/0124096 A1 | 5/2015 | Koravadi |
| 2015/0158499 A1 | 6/2015 | Koravadi |
| 2015/0251599 A1 | 9/2015 | Koravadi |
| 2015/0344028 A1 | 12/2015 | Gieseke et al. |
| 2015/0352953 A1 | 12/2015 | Koravadi |
| 2016/0036917 A1 | 2/2016 | Koravadi et al. |
| 2016/0116590 A1* | 4/2016 | Fukuman ............ G01S 15/931 367/96 |
| 2016/0203374 A1* | 7/2016 | Zeng ................... G01S 13/726 382/104 |
| 2016/0210853 A1 | 7/2016 | Koravadi |
| 2017/0015312 A1 | 1/2017 | Latotzki |
| 2017/0017847 A1 | 1/2017 | Nakaya |
| 2017/0050672 A1 | 2/2017 | Gieseke et al. |
| 2017/0212513 A1* | 7/2017 | Iida ........................ B62D 6/00 |
| 2017/0222311 A1 | 8/2017 | Hess et al. |
| 2017/0253237 A1 | 9/2017 | Diessner |
| 2017/0254873 A1 | 9/2017 | Koravadi |
| 2017/0276788 A1 | 9/2017 | Wodrich |
| 2017/0315231 A1 | 11/2017 | Wodrich |
| 2017/0317748 A1 | 11/2017 | Krapf |
| 2017/0329346 A1 | 11/2017 | Latotzki |
| 2017/0356994 A1 | 12/2017 | Wodrich et al. |
| 2018/0015875 A1 | 1/2018 | May et al. |
| 2018/0045812 A1 | 2/2018 | Hess |
| 2018/0231635 A1 | 8/2018 | Woehlte |
| 2018/0300563 A1* | 10/2018 | Steinmeyer ............ G08G 1/14 |
| 2019/0258878 A1* | 8/2019 | Koivisto ................ G01S 7/417 |
| 2020/0130676 A1 | 4/2020 | Smid |

\* cited by examiner

VEHICULAR CONTROL SYSTEM

CROSS REFERENCE TO RELATED APPLICATIONS

The present application is a division of U.S. patent application Ser. No. 17/663,221, filed May 13, 2022, now U.S. Pat. No. 11,753,002, which is a division of U.S. patent application Ser. No. 16/738,561, filed Jan. 9, 2020, now U.S. Pat. No. 11,332,124, which claims priority of U.S. provisional application Ser. No. 62/796,715, filed Jan. 25, 2019, and U.S. provisional application Ser. No. 62/790,495, filed Jan. 10, 2019, which are hereby incorporated herein by reference in their entireties.

FIELD OF THE INVENTION

The present invention relates generally to a parking assist system for a vehicle and, more particularly, to a vehicular parking assist system that utilizes one or more non-vision sensors at a vehicle.

BACKGROUND OF THE INVENTION

Ultrasonic sensors have been used in automotive applications to detect objects, to assist in avoiding collisions, and to assist drivers when parking the vehicle. Typically, multiple sensors are used to provide a localization of the nearest object to the car. Localization is typically performed using trigonometry calculations of fused sensors data. The approach lacks certain capabilities, such as finding shapes of objects present in the field of sensing, and involving temporal information. It is also subject to errors due to presence of noise in the sensor signals.

Two common applications of ultrasonic sensors are automated parking and collision detection. In some automated parking systems, detected points used to detect vehicles and empty spaces between vehicles (see FIG. 1). However, the points may get less and less dense as the parking vehicle drives faster along the road past the parked vehicles and the parking spaces, and the points may leak into empty regions, which makes the prediction of the parking gap difficult, and as a result, the system often misses slim parking spots, and the system cannot distinguish parallel, perpendicular, and fish-bone spots. Thus, a user's input is needed to look for a specific parking type.

SUMMARY OF THE INVENTION

The present invention provides a driver assistance system or parking assist system for a vehicle that utilizes one or more sensors (e.g., ultrasonic sensors, radar sensors, etc.), and generates a potential map that is used to determine available parking spaces, including parallel parking spaces (generally parallel to the direction of travel of the vehicle along the road), perpendicular parking spaces (generally perpendicular to the direction of travel of the vehicle along the road), and fish-bone parking spaces (angled relative to the direction of travel of the vehicle along the road, such as at an angle between 10 degrees and 80 degrees or between 20 degrees and 70 degrees or between 30 degrees and 60 degrees relative to the direction of travel of the vehicle along the road). Data captured by the sensors is processed at a control to detect an object present in the respective fields of sensing and to determine distance from the respective sensor to the detected objects. A control designates a plurality of locations within the fields of sensing. As the vehicle moves along the road, the control increases a value for each designated location when an object is detected at that designated location and decreases the value for each designated location when an object is not detected at that designated location. The control, as the vehicle moves along the road, generates an object map based on values for the designated locations. The greater the value for a particular designated location, the greater the probability an object is present at that particular designated location.

These and other objects, advantages, purposes and features of the present invention will become apparent upon review of the following specification in conjunction with the drawings.

DESCRIPTION OF THE PREFERRED EMBODIMENTS

A vehicle vision system and/or driver assist system and/or object detection system and/or parking assist system operates to capture data representative of the scene exterior of the vehicle and may process the captured data to detect objects at or near the vehicle, such as to detect parked vehicles and/or a parking space and to maneuver the vehicle into the detected or selected parking space and/or to assist a driver of the vehicle in maneuvering the vehicle into the detected or selected parking space. The system includes a data processor or data processing system that is operable to receive data from a plurality of sensors (such as ultrasonic sensors) and provide an output to a control having the data processor.

Figure 1:
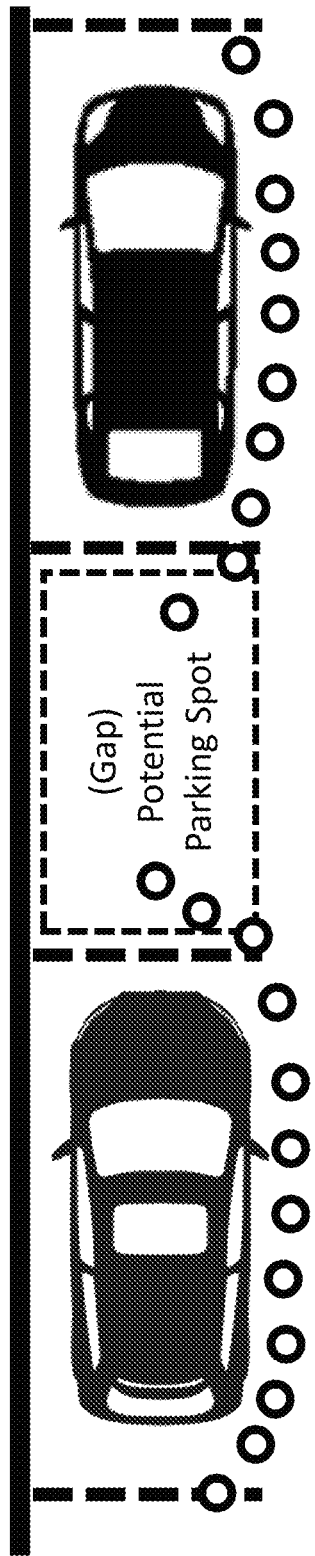
FIG. 1 is a plan view of a parking space between two parked vehicles for sensing by a parking assist system.
Figure 2:
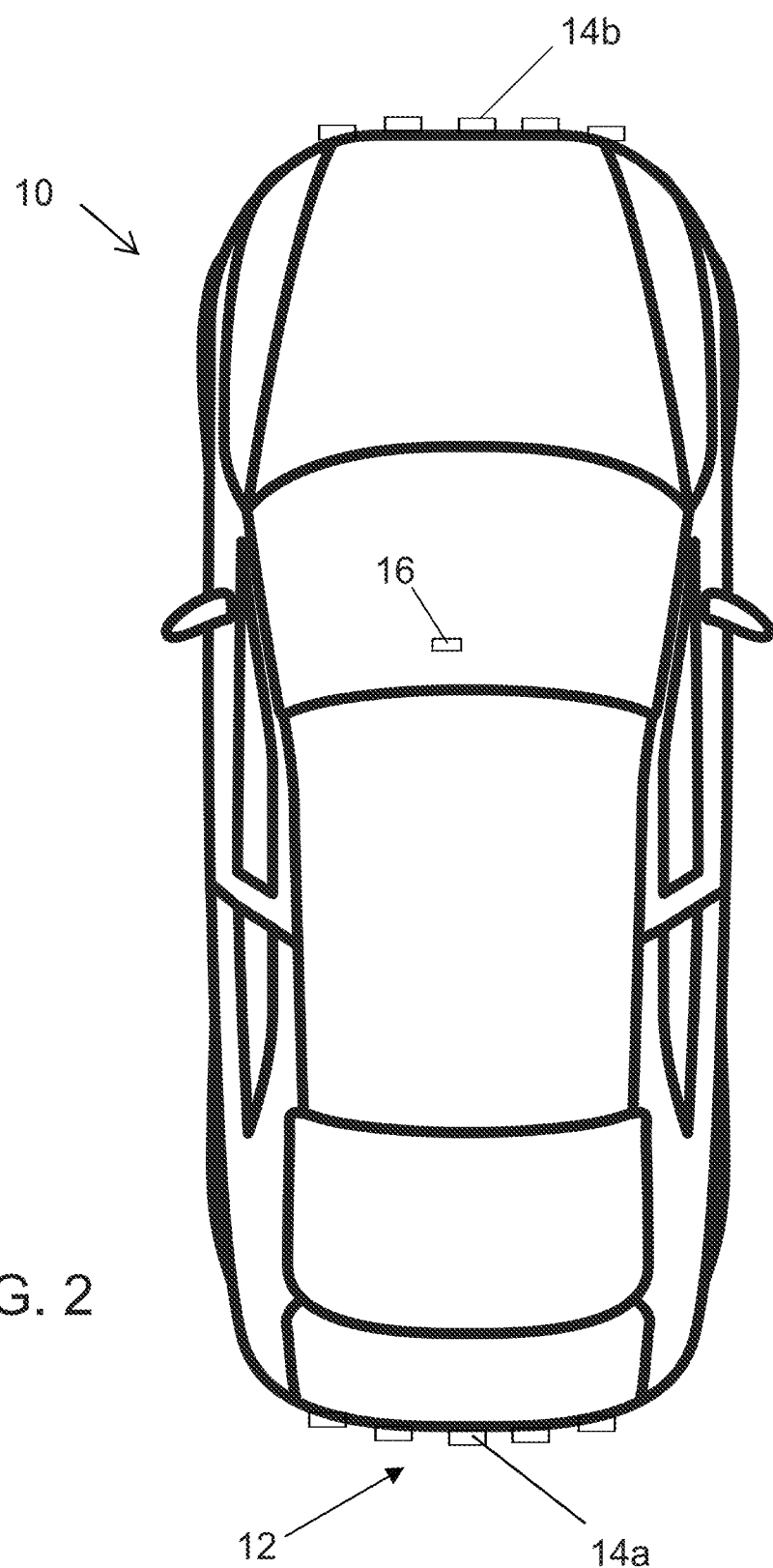
FIG. 2 is a plan view of a vehicle with a sensing system that incorporates ultrasonic sensors in accordance with the present invention.

Referring now to the drawings and the illustrative embodiments depicted therein, a vehicle 10 includes a parking assist system 12 that includes a plurality of ultrasonic sensors, such as a rearward and sideward sensing sensors 14a at a rear portion of the vehicle and forward and sideward sensing sensors 14b at a front portion of the vehicle (FIG. 2). The system may also optionally include multiple exterior viewing imaging sensors or cameras, such as a forward viewing camera at the front (or at the windshield) of the vehicle, and sideward/rearward viewing cameras at the sides of the vehicle and a rearward viewing camera at the rear of the vehicle), which capture image data representative of the scene exterior of the vehicle. The system 12 includes a control or electronic control unit (ECU) 16 that includes electronic circuitry and associated software, with the electronic circuitry including a data processor that is operable to process data captured by the sensors and may detect objects or the like present in the field of sensing of the sensors. The data transfer or signal communication from the sensors to the ECU may comprise any suitable data or communication link, such as a vehicle network bus or the like of the equipped vehicle.

The task of automated parking has significant importance among vehicle manufacturers, although its design complexity has made it less effective to be commonly used by drivers. The need for minimal cost of sensors and hardware has been limiting the success of proposed solutions in the market. Ultrasonic sensors are low in cost, but they typically have poor resolution and wide beam patterns, making it difficult to use them for estimating location and shape of objects around the vehicle at which they are disposed.

The present invention provides a system or method to generate an environmental map of objects around a vehicle using data captured by ultrasonic sensors disposed at the vehicle. The environmental map of objects around the vehicle can be used for many applications, including automated parking system and collision avoidance. This approach may roughly extract or determine an outer shape of objects, which can be used to identify the type of parking pace (i.e., parallel, perpendicular, or fish-bone), and may adjust a parking maneuver during a parking process, and may provide efficient collision avoidance.

The system provides a platform to readily fuse signals coming from multiple ultrasonic sensors. The system removes or reduces or limits noise of ultrasonic sensors by nature, without any computational effort. A machine learning-based tool is used to calibrate the system, aiming to generate unique patterns, disregarding vehicle speed and distance to objects.

The system of the present invention generates an environmental map with reduced or minimal computational effort. This provides significant enhancements to automated parking system designs with affordable ultrasonic sensors. The system provides automated detection of the particular application or parking type (i.e., perpendicular parking, parallel parking, and fish-bone parking). Thus, the system does not require any initiative or input or guidance from the vehicle driver. The system or method measures an accurate or substantially accurate size of an available parking spot, and makes it possible to park in empty spots with minimum acceptable size.

Figure 4:
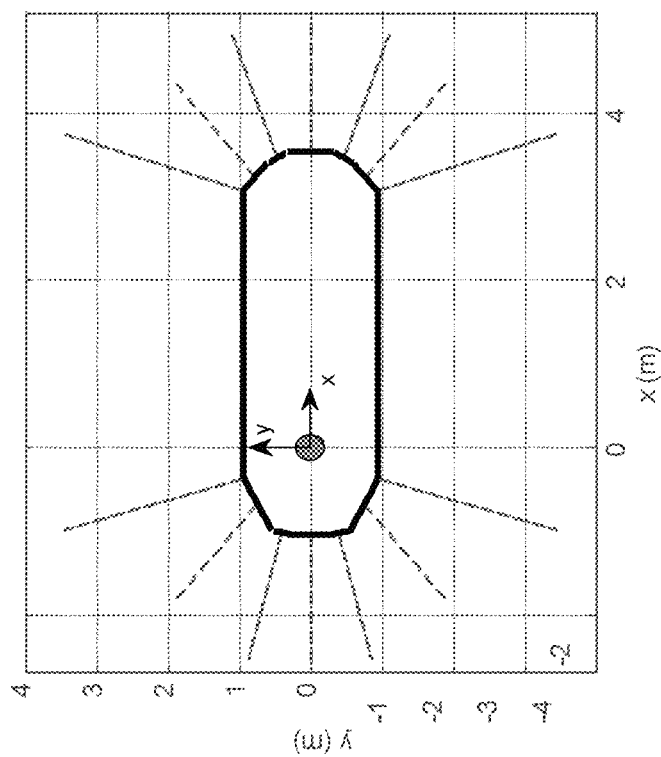
FIGS. 3 and 4 are schematics of an equipped vehicle, showing the multiple sensors and fields of sensing at the front and rear and sides of the vehicle.
Figure 3:
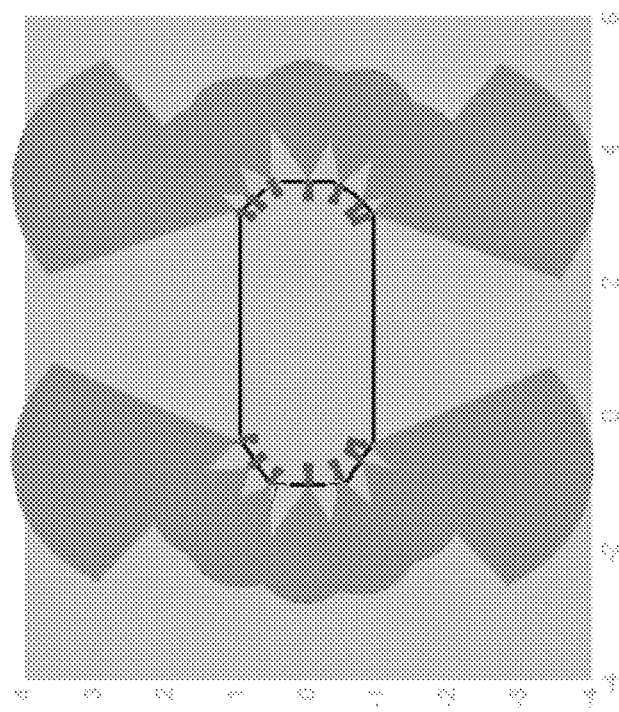

The system utilizes, for example, ultrasonic sensors at the vehicle and provides for ultrasonic sensor alignment. For example, and with reference to FIGS. 3 and 4, assume N sensors are placed around the vehicle, each with known geometrical information, $[x^i, y^i, z^i, \theta^i]^T$, with respect to the kinematic center of the vehicle, and with known beam patterns. The maximum range of each sensor is also given as $r_{max}^i$. For automated parking systems, the most common configuration is to have 12 sensors disposed around the vehicle, including four side sensors, four sensors at the front of the vehicle, and four sensors at the rear of the vehicle, as shown in FIGS. 3 and 4. Each of the sensors has a known sensing pattern (i.e., field of sensing), and all the sensors together span at least a part of the space around the vehicle.

Figure 5:
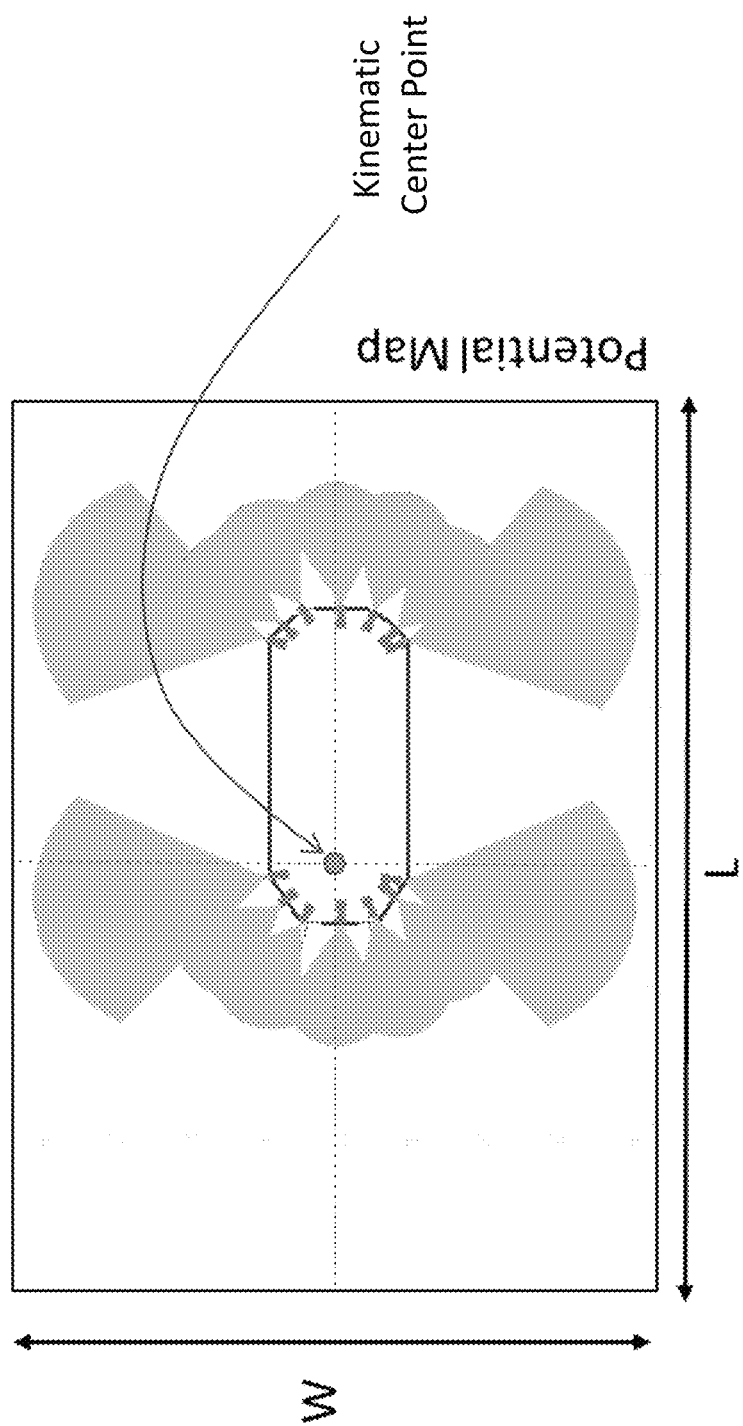
FIG. 5 is another schematic of the vehicle, showing the center of the potential map being at the kinematic center point of the vehicle.

The system designates a plurality of locations within the fields of sensing around the vehicle. The plurality of locations may be organized into a two dimensional grid of points with resolution "res." Thus, each point of a grid (i.e., each designated location) occupies res×res (e.g., square meters in the physical world). The value of each grid point represents the confidence of having an object at its corresponding point in physical space. For the ease of formulation, the center of the environmental map is placed at the kinematic center of the vehicle (such as shown in FIG. 5).

Figure 6:
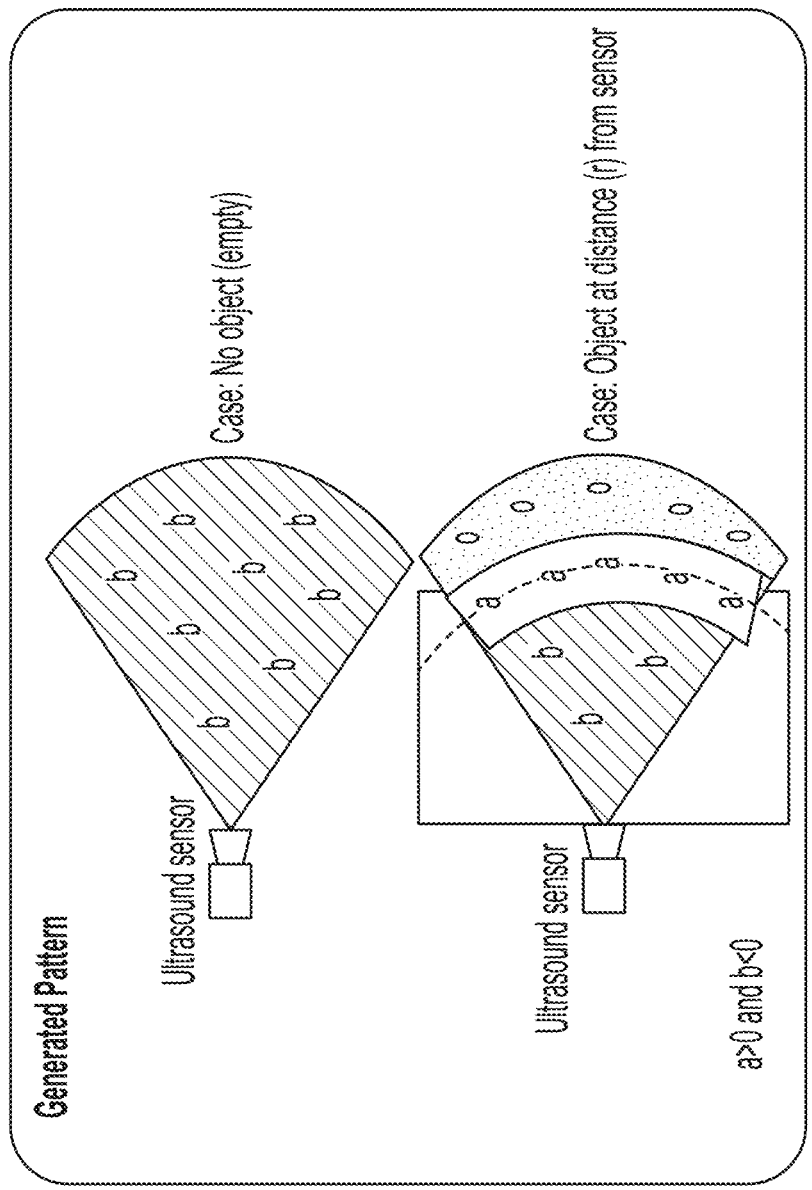
FIG. 6 is a schematic showing patterns and assigned positive or negative points for situations when no object is detected in the field of sensing of the sensor and when an object is detected at a distance r from the sensor.

With reference to FIG. 6, assume two cases for an ultrasonic sensor with a known pattern or field of sensing, with one case being when no object has been detected within the detection range of the sensor, and the other case being when an object has been detected at a distance (r) from the vehicle. For each case, different patterns of potential levels are added to the environmental map, such as shown in FIG. 6, with a and b representing positive and negative potential levels, respectively. In the first case, no object is detected by the sensors, and therefore, all points in the field of sensing of that sensor are assigned a negative value b. In the second case, points located on the arc with distance r from the sensor are assigned a positive value a, and points inside the arc receive a negative value b, as there should not be any object inside the arc region. For points out of the arc, the system stays neutral (e.g., those points are assigned a value of 0).

Thus, the system may assign the value a to all designated locations the same distance from the vehicle as the detected object for each frame or time stamped data captured by the sensor (in which the object is detected). Because the detected object represents the nearest object to the vehicle, all designated locations nearer to the vehicle than the detected object do not include an object, and therefore the system may assign the value b to those designated locations. Because the system may not be able to determine presence of an object further than the nearest detected object, the system may maintain the value of all designated locations that are further from the vehicle than the detected object.

The system may add the values (i.e., a and b) to previous values assigned to the respective locations. That is, the system may increase the value associated with a respective designated location (i.e., a point in the grid) when the system determines an object may be present at that location. Similarly, the system may decrease the value associated with a respective designated location when the system determines that an object is not or may not be present at that location. In other words, as the vehicle moves along the road, for each designated location, the system determines how many times an object is detected (including how many times that location is at an arc at a distance of a detected object) and sums that value (or increases a count for each location each time that location has value "a" assigned), and the system determines how many times an object is not detected at each designated location (or decreases the count for each location each time that location has value "b" assigned). For example, each designated location may initially be assigned a value of zero, and may be incrementally increased or decreased depending on whether or not an object is detected via processing of the outputs of one or more of the sensors.

Figure 7:
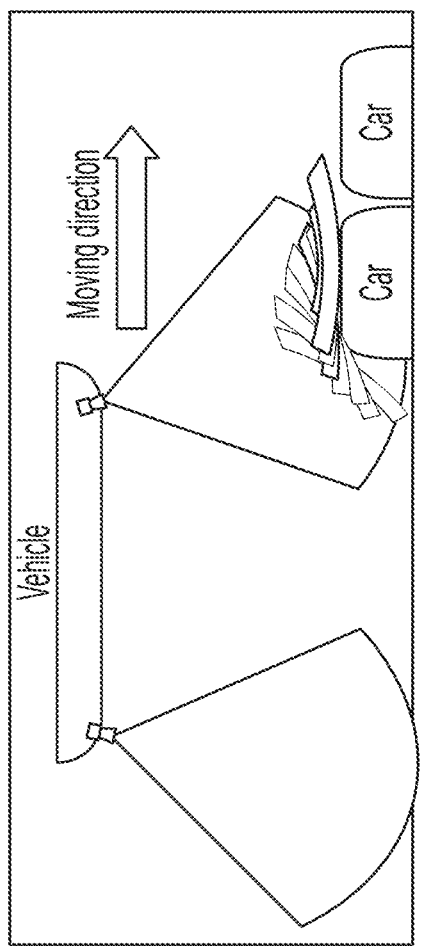
FIG. 7 is a plan view showing a side portion of the vehicle and sideward sensors for sensing parking spaces and vehicles as the vehicle moves along the road.
Figure 8:
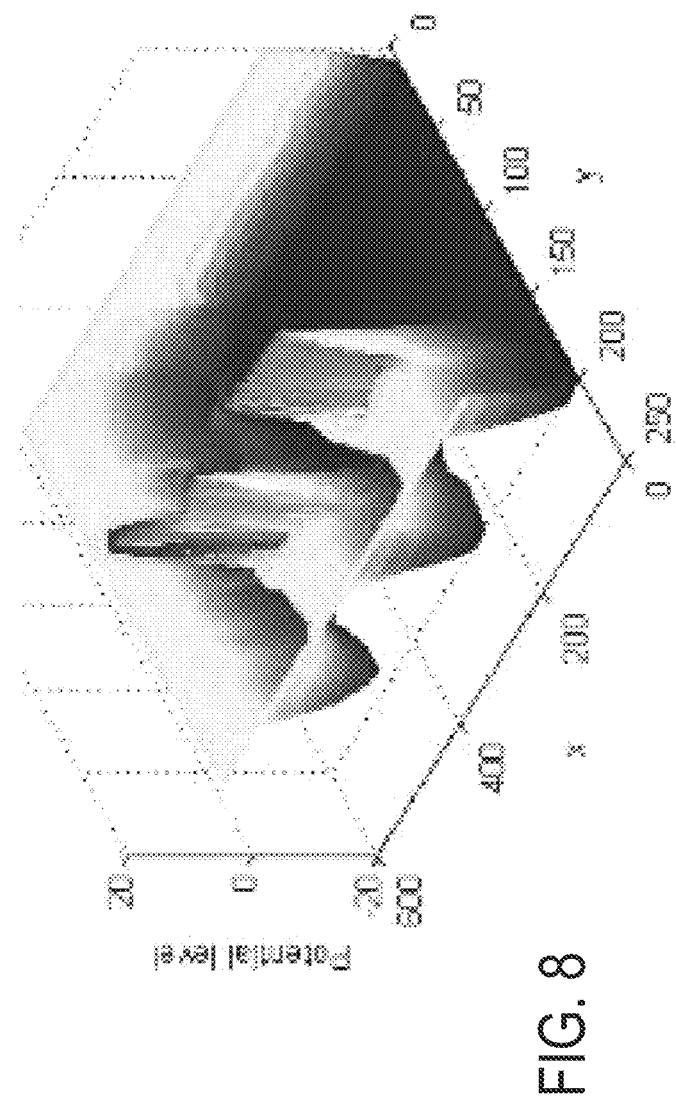
FIG. 8 is an example of a potential map generated by the system.

The process of scanning the physical world using ultrasonic sensors includes moving the vehicle along a traffic lane or road to find a parking spot (see FIG. 7). The ultrasonic sensors periodically take samples from the environment and ultrasonic sensor patterns are generated at each time stamp. That is, periodically (e.g., at regular intervals) the sensors capture a frame of sensor data. For example, the sensors may capture a frame of sensor data every 3 milliseconds or every 10 milliseconds or any suitable capture rate. The generated patterns for each sensor at each time are added on the potential object map or potential map or object map. That is, the system may update the value at each designated location based on each frame of sensor data captured by the plurality of sensors. After adding signal patterns to the potential map, the potential map can be transformed according to the opposite direction of the vehicle movement. By moving the potential object map, and adding patterns to it, the system reconstructs an environmental map of objects around or alongside the vehicle, in which only points corresponding to objects in the physical world receive high (positive) values in the potential map, and noise signals get removed naturally in the process of adding patterns from multiple sensors on the potential map. An example of a generated potential map is shown in FIG. 8. The higher values occur when multiple sensors or the same sensor at multiple time stamps senses an object at a particular point, whereby the positive values (a) assigned at those points are added together.

Thus, the greater the value or count at a particular designated location, the greater the probability an object is present at that particular designated location. The potential object map may be regenerated periodically as the vehicle moves. For example, the potential object map may be regenerated each time the vehicle travels a threshold distance. The threshold distance may be equivalent to the resolution of the grid (i.e., the distance between each designated location). When the system regenerates the potential object map, the map will be re-centered at the vehicle's current location. Thus, as the vehicle travels in a given direction, the potential object map will add designated locations to the map toward the direction of travel while dropping off the designated locations at the edge of the map in the opposite direction of travel. That is, the potential object map may "slide" along with the vehicle as the vehicle maneuvers in a direction of travel (e.g., along a road, parking lot, etc.). The system may regenerate the potential object map based on the most recent frame of sensor data.

The system may update the value at each designated location based on movement of the vehicle. For example, the system may update the value at each designated location each time the vehicle travels a threshold distance (e.g., 0.1 meters).

At any given time, the current potential object map provides an indication of the probability of an object at each designated location of the grid that has been sensed by one or more sensors at the vehicle (i.e., a confidence value). After the vehicle has fully passed a particular grid (i.e., the forward most designated location for that grid is rearward of the vehicle and beyond the field of sensing of rearward sensing sensors), the grid or potential object map provides a probability map with a high confidence level for the probability of an object at each designated location of the grid. The system can determine whether or not there is sufficient space (i.e., a parking space) with no objects present, such as a parking space between two parked vehicles.

The system combines or fuses the sensor data (captured by the multiple ultrasonic sensors). Signals output by all the sensors are processed through the potential-map generation, and if any sensor detects an object at a distance, its corresponding arc is added to the map. Sometimes a noisy signal may be output and result in a wrong arc or wrong value on the potential map. The process of potential-map generation results in de-noising the signals or the map.

If a sensor does not detect any object, it puts negative add-on values on grid points corresponding to its field of sensing. And if a sensor detects an object at distance r, grid points corresponding to the field of sensing with radius less than r will receive negative add-on values. Since all sensors contribute to the generation of one potential-map over time, the generated potential-map provides a flexible tool to fuse sensor data and preserves temporal information in an efficient way of using memory. This data-fusion framework has minimal computational complexity compared to conventional methods based on trigonometry calculations.

The system provides for a fast generation of a potential-map. Finding the geometry of points on the arcs can be computationally massive. Each sensor has a specific number of arcs, depending on the range of the sensor. For example, if the range of a sensor is 4.5 meters, it will have 45 arcs at res=0.1. For N sensors, with each sensor having $m_n$ arcs, the total number of arcs is:

$$N_{arc} = \Sigma_{n=1}^{N} m_n.$$

In order to speed up the Potential-Map generation process, the geometry of $N_{arc}$ arcs are pre-calculated and stored in a table, so that each row of the table represents indices of points belonging to an arc belonging to the sensor n and arc m.

The rows of the table are concatenated or linked, forming an array PotMapInds, and indices of a start and an end of each row are stored in another table, as $ind_{strt}(n, m)$ and $ind_{last}(n, m)$, respectively. The indices (Inds) of points on an arc (m, n) are obtained via the following equation:

$$\text{Inds} = \text{PotMapInds}([ind_{strt}(n,m), \ldots, ind_{last}(n,m)])$$

This method is also referred to as a Hash-Table (see FIG. 9), and facilitates fast generation of a potential-map during the run-time process.

Figure 9:
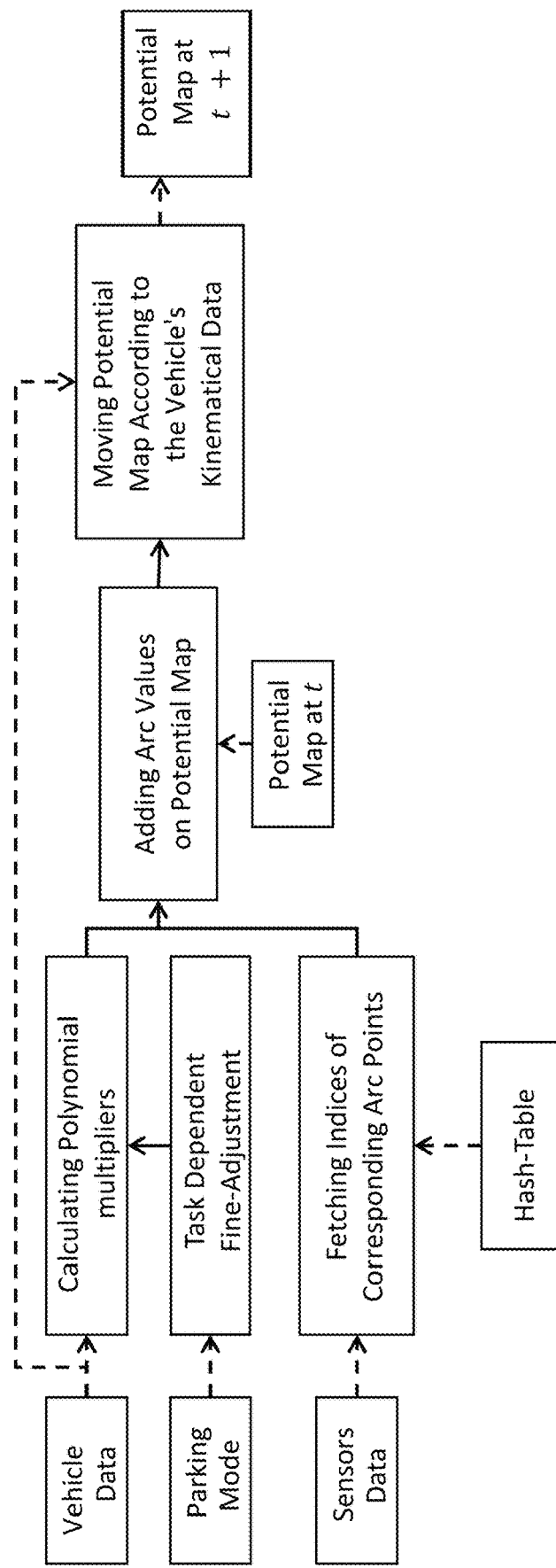
FIG. 9 is a block diagram showing the process of generating a potential map via the system.

Thus, and as can be seen with reference to FIG. 9, the system generates a potential-map based on inputs of vehicle data, the parking mode, and sensor data. The Hash-Table is input with the sensor data, and the system fetches or collects indices of corresponding arc points. The system also makes task dependent fine adjustments based on the parking mode, and calculates polynomial multipliers based on the fine adjustments and the vehicle data. The calculated polynomial multipliers and the indices of corresponding arc points are used to add arc values on a potential map (based at least in part on an initial map (generated at time t). The potential map is moved according to the vehicle data (e.g., the vehicle's kinematic data) to determine or generate the potential map at the new time (t+1).

The generation of a potential map for side sensors needs calibration depending on their ultrasonic beam pattern. This is because each point passing through the field of view of the sensors will receive a different magnitude at the end, depending on the speed of the vehicle and the lateral distance of the object from the respective side sensor at the vehicle. The sensors send data on a specific time period (let us assume T_s=0.03 sec). Once the vehicle passes along an object, the side sensor senses it as long as the object is aligned inside the sensor's field of view. Now, assume the vehicle passes by the object with a low speed (such as 2 km per hour). Then, the object will be inside the field of view for a longer time, and therefore, the sensor sends a lot of detection signals corresponding to the object. Now, assume the length of sensor's field of view at the lateral distance of the object from the vehicle is 3 meters. The number of detection signals from the sensor is (1/0.03)*3/(2000/3600) =180. Now, compare that with a case where the vehicle travels at the speed of 20 km per hour, in which the number of detection signals equals only 18.

The second issue is the lateral distance of objects from the vehicle. Assume two similar objects are placed at different lateral distances from the vehicle, such that the first one is closer to the vehicle. Because the sensor's field of view has a pyramidal shape, the travel distance inside the field of view is shorter for the closer object than the object with the higher lateral distance from the vehicle. For instance, assume the travel distance of the closer object is 2 meters and the travel distance of the second object is 4 meters, and the vehicle is passing at the speed of 2 km per hour. The number of detection signals in the closer object will be half of the number of detection signals by the second object. This results in variable brightness of seen objects on the potential-map, and can have a negative effect on parking slot detection. This is not desired, as the system needs to have a uniform pattern of potential-map generation around the vehicle.

As explained in the previous paragraph, because the vehicle speed and lateral distance of objects have inverse and direct nonlinear influences on the potential level, respectively, the system uses two polynomial functions to model and to compensate for or accommodate these two behaviors. That is, the system may calibrate the value at each designated location based on the velocity and the distance between the vehicle and the respective designated location. For example, the potential map at each arc will be multiplied by $F_v(v)/F_y(y)$, in which v and y are speed and lateral distance (respectively) of the point in the field of sensing, and $F_v$ and $F_y$ are polynomial functions of speed and lateral distance, respectively. $F_v$ and $F_y$ are polynomial functions of order $n_y$ and $n_y$. $F_v$ and $F_y$ are obtained through a machine learning process, such that a set of recorded data of the vehicle passing an object with a wide range of different speeds and lateral distances are covered. The process of machine learning is designed to make a uniform pattern of potential map generation around the vehicle, disregarding speed of the vehicle (relative to the objects) and lateral distance of objects from the side sensors.

Figure 10:
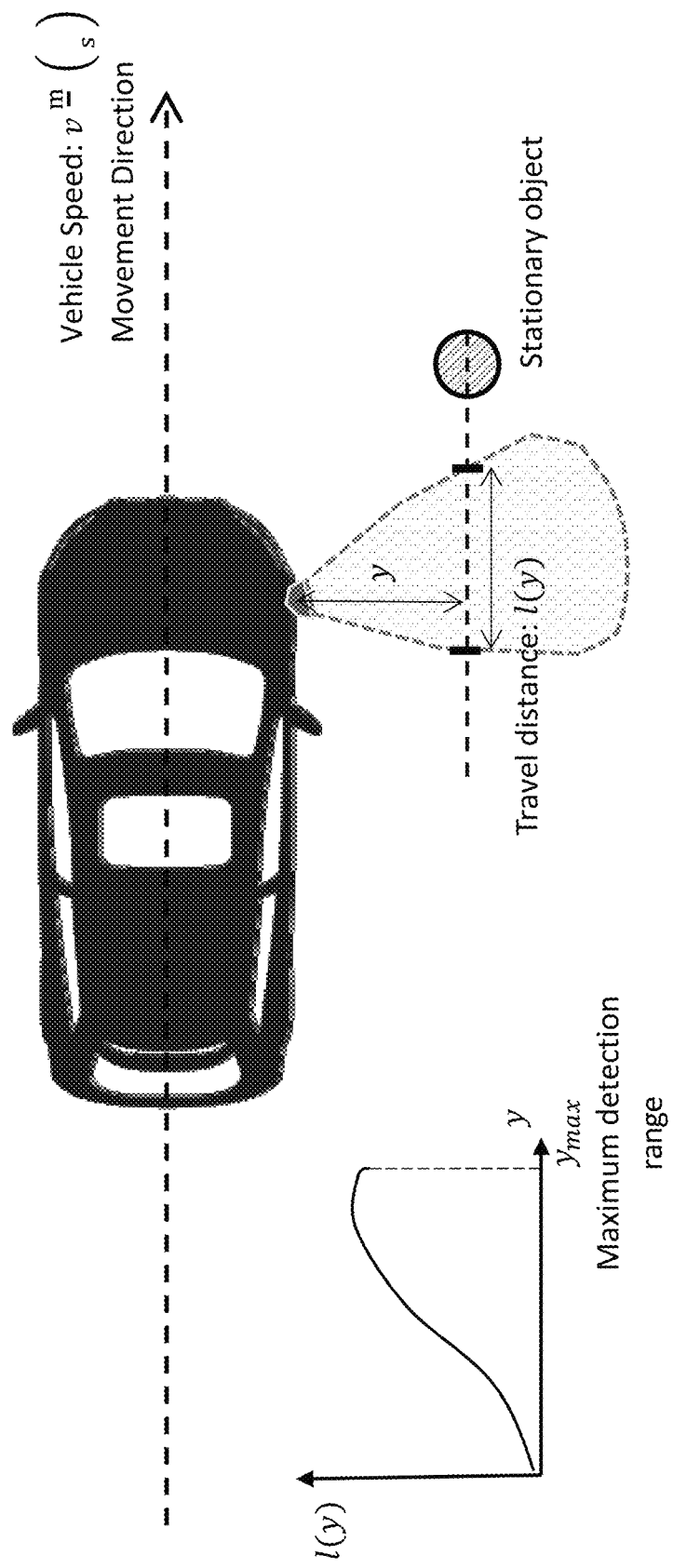
FIG. 10 is a plan view of the vehicle moving along the road by a stationary object, showing physical quantities (including vehicle speed, lateral distance, travel distance of object to the vehicle) related to the potential-map calibration process.

The calibration objective is to find a coefficient that equalizes potential map for variable vehicle speed and lateral distances of objects to the vehicle. With reference to FIG. 10, T is the time interval that the object passes through the field of view, and T_s is the time period of receiving the ultrasonic sensor's data. The travel time equals T=I(y)/v, where y and v are lateral distance of the object to the vehicle and the vehicle speed, respectively. The magnitude of potential map correspond to the object, once the point exits the field of view is $P(y,v)=(I(y)/(v*T\_s))*m(y,v)$, with $m(y,v)$ being the coefficient function of interest.

Note that the calibration process depends on the sensor's mounting angle at the vehicle, the sensor's range, and the sensor's sensing pattern, and changes to each of these three factors requires a brand new calibration process.

Assume P_des is the desirable potential map level of an object once passed through the ultrasound sensor's field of view. The coefficient function is defined to maintain achieving P_des, disregarding the values of y and v, as follows:

$$m(y,v,T\_s)=P\_des*(v*T\_s)/(I(y))$$

To generalize the above equation, it can be re-formulated as division of two polynomial functions of v and y, as follows:

$$m(y,v,T\_s)=P\_des*T\_s*Fv(v)/Fy(y)$$

Now, the goal is to estimate Fv(v) and Fy(y) from actual data from the ultrasonic sensor of interest. For actual data, the observed potential level, after the object passes through the field of view at the vehicle speed of v and lateral distance of y, is P_ob. So, the vehicle passes through the object for n_vid times, each time for a known v_k and y_k, and the videos are recorded for the offline process. The multipliers of Fv(v) and Fy(y) are separately estimated. First, Fy(y) is fixed, and Fv(v) is updated, and afterwards, Fv(v) is fixed, and Fy(y) is updated. The process of updating Fv(v) and Fy(y) goes as follows:

1. Initialize $F_v(v)=F_y(y)=1$.
2. Run potential map on the recorded videos (n_vid videos), and find P_ob of each video.
3. Find a and b for (a*y+b) regression using least square error method, such that the sum of errors of err_k= (P_des/P_ob_k)−(a*y_k+b) for all ks are minimized.
4. Once a and b are obtained, update Fy(y)=Fy(y)*(a*y+b).
5. Run potential map on the recorded videos (n_vid videos), and find P_ob of each video.
6. Find c and d for (c*v+d) regression using least square error method, such that the sum of errors of err2_k= (P_ob_k/P_des)−(c*v_k+d) for all ks are minimized.
7. Once c and d are obtained, update Fv(v)=Fv(v)*(c*v+d).
8. Repeat steps 2 to 7 for few iterations until the first n'th order parameters of Fv(v) and Fy(y) are stabilized.

The obtained Fv(v) and Fy(y) are stored and used during the scanning process for parking spot detection.

The present invention provides a potential map generator to enhance detection of parking spaces and to enhance sensing of vehicles and objects to provide for autonomous parking of the vehicle at a detected parking space and autonomous maneuvering of the vehicle along a road. The potential map generation process supports sensor fusion and noise removal, compared to existing methods which require additional processing blocks to support sensors fusion and noise removal. The potential map generation process keeps temporal information of object detection in the most efficient way, whereas existing solutions require large memory to store history of detected points, and to perform necessary processes at each time stamp to model the stored point according to a kinematic model of the vehicle. The potential map generation process determines and draws outer shapes of detected objects, and facilitates detecting the type of parking spot, including parallel, perpendicular, and fishbone. There is no existing method that is capable of automatically detecting a fish-bone parking spot using only ultrasonic sensors. The potential map generation process facilitates accurate or nearly exact measurement of parking gaps, and allows the vehicle to park in a smallest possible parking space. The potential map generation process reduces computational complexity of generating an environmental map. Existing methods rely on trigonometry calculations, whereas the potential-map generator does not require such complicated calculations. Instead, the potential-map generation process uses Hash-Table to quickly put arcs on the potential map.

The system uses the generated potential-map to determine parking spaces (as the vehicle is being autonomously driven or maneuvered along a road) and, responsive to determining an appropriate parking space, the system may control the vehicle (such as via controlling steering of the vehicle and/or braking of the vehicle and/or acceleration of the vehicle) to maneuver the vehicle into the determined parking space.

The system may utilize aspects of the parking assist systems and/or vehicle motion modeling systems described in U.S. Pat. Nos. 9,205,776 and/or 8,874,317, and/or U.S. Publication Nos. US-2017-0329346; US-2017-0317748; US-2017-0253237; US-2017-0050672; US-2017-0017847;

US-2017-0015312 and/or US-2015-0344028, which are hereby incorporated herein by reference in their entireties.

For autonomous vehicles suitable for deployment with the system of the present invention, an occupant of the vehicle may, under particular circumstances, be desired or required to take over operation/control of the vehicle and drive the vehicle so as to avoid potential hazard for as long as the autonomous system relinquishes such control or driving. Such occupant of the vehicle thus becomes the driver of the autonomous vehicle. As used herein, the term "driver" refers to such an occupant, even when that occupant is not actually driving the vehicle, but is situated in the vehicle so as to be able to take over control and function as the driver of the vehicle when the vehicle control system hands over control to the occupant or driver or when the vehicle control system is not operating in an autonomous or semi-autonomous mode.

Typically an autonomous vehicle would be equipped with a suite of sensors, including multiple machine vision cameras deployed at the front, sides and rear of the vehicle, multiple radar sensors deployed at the front, sides and rear of the vehicle, and/or multiple lidar sensors deployed at the front, sides and rear of the vehicle. Typically, such an autonomous vehicle will also have wireless two way communication with other vehicles or infrastructure, such as via a car2car (V2V) or car2x communication system.

The system may also communicate with other systems, such as via a vehicle-to-vehicle communication system or a vehicle-to-infrastructure communication system or the like. Such car2car or vehicle to vehicle (V2V) and vehicle-to-infrastructure (car2X or V2X or V2I or a 4G or 5G broadband cellular network) technology provides for communication between vehicles and/or infrastructure based on information provided by one or more vehicles and/or information provided by a remote server or the like. Such vehicle communication systems may utilize aspects of the systems described in U.S. Pat. Nos. 6,690,268; 6,693,517 and/or 7,580,795, and/or U.S. Publication Nos. US-2014-0375476; US-2014-0218529; US-2013-0222592; US-2012-0218412; US-2012-0062743; US-2015-0251599; US-2015-0158499; US-2015-0124096; US-2015-0352953; US-2016-0036917 and/or US-2016-0210853, which are hereby incorporated herein by reference in their entireties.

The system may utilize other non-imaging sensors, such as radar or lidar sensors or the like. The sensing system may utilize aspects of the systems described in U.S. Pat. Nos. 9,753,121; 9,689,967; 9,599,702; 9,575,160; 9,146,898; 9,036,026; 8,027,029; 8,013,780; 7,053,357; 7,408,627; 7,405,812; 7,379,163; 7,379,100; 7,375,803; 7,352,454; 7,340,077; 7,321,111; 7,310,431; 7,283,213; 7,212,663; 7,203,356; 7,176,438; 7,157,685; 6,919,549; 6,906,793; 6,876,775; 6,710,770; 6,690,354; 6,678,039; 6,674,895 and/or 6,587,186, and/or International Publication Nos. WO 2018/007995 and/or WO 2011/090484, and/or U.S. Publication Nos. US-2018-0231635; US-2018-0045812; US-2018-0015875; US-2017-0356994; US-2017-0315231; US-2017-0276788; US-2017-0254873; US-2017-0222311 and/or US-2010-0245066, which are hereby incorporated herein by reference in their entireties.

The system may include cameras and an image processor operable to process image data captured by the cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

For example, the system and/or processing and/or cameras and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in International Publication Nos. WO 2010/144900; WO 2013/043661 and/or WO 2013/081985, and/or U.S. Pat. No. 9,126,525, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular control system, the vehicular control system comprising:

a plurality of radar sensors disposed at a vehicle and having respective fields of sensing exterior of the vehicle, wherein the plurality of radar sensors are arranged at the vehicle so as to have a combined field of sensing forward, rearward and sideward of the vehicle;

a control comprising electronic circuitry and associated software, wherein said electronic circuitry comprises a data processor for processing sensor data captured by the plurality of radar sensors;

wherein each radar sensor of the plurality of radar sensors captures sensor data as the vehicle moves along a road;

wherein the sensor data captured by each radar sensor of the plurality of radar sensors are processed at the control for detecting objects present exterior of the vehicle and for determining distances between detected objects and respective radar sensors sensing the detected objects;

wherein the control designates a plurality of locations within the fields of sensing of the plurality of radar sensors;

wherein, as the vehicle moves along the road, the control increases a value for each designated location when an object is detected at that designated location;

wherein, as the vehicle moves along the road, the control decreases the value for each designated location when an object is not detected at that designated location;

wherein, as the vehicle moves along the road, the control generates an object map based on values for the designated locations, and wherein the greater the value for a particular designated location, the greater the probability an object is present at that particular designated location; and wherein, responsive to the generated object map, the control determines an available parking space for parking the vehicle.

2. The vehicular control system of claim 1, wherein the control assigns an initial value to each designated location of the plurality of designated locations.

3. The vehicular control system of claim 1, wherein, responsive to determination of an available parking space, the control generates control signals to control the vehicle to park the vehicle in the determined available parking space.

4. The vehicular control system of claim 1, wherein, responsive to determining distance between a detected object and a respective radar sensor based on sensor data from the respective radar sensor of the plurality of radar sensors, the control increases the value for each designated location that is the same distance from the respective radar sensor.

5. The vehicular control system of claim 4, wherein, responsive to increasing the value for each designated location that is the same distance from the respective radar sensor, the control decreases the value for each designated location that is closer to the respective radar sensor than the distance between the respective radar sensor and the detected object.

6. The vehicular control system of claim 1, wherein, responsive to receiving captured sensor data, the control updates the value at each designated location based on processing of the captured sensor data.

7. The vehicular control system of claim 1, wherein, responsive to the vehicle moving along the road for a threshold distance, the control updates the values at each designated location based on processing of the most recently captured sensor data.

8. A vehicular control system, the vehicular control system comprising:

a plurality of sensors disposed at a vehicle and having respective fields of sensing exterior of the vehicle, wherein the plurality of sensors are arranged at the vehicle so as to have a combined field of sensing forward, rearward and sideward of the vehicle;

wherein the plurality of sensors comprises at least a plurality of cameras and a plurality of radar sensors;

wherein the plurality of cameras comprises (i) a forward viewing camera disposed at and viewing forward through a windshield of the vehicle, (ii) a left-side camera disposed at a left side of the vehicle and viewing at least sideward and (iii) a right-side camera disposed at a right side of the vehicle and viewing at least sideward;

a control comprising electronic circuitry and associated software, wherein said electronic circuitry comprises a data processor for processing sensor data captured by the plurality of sensors;

wherein each sensor of the plurality of sensors captures sensor data as the vehicle moves along a road;

wherein the sensor data captured by each sensor of the plurality of sensors are processed at the control for detecting objects present exterior of the vehicle and for determining distances between detected objects and respective sensors sensing the detected objects;

wherein the control designates a plurality of locations within the fields of sensing of the plurality of sensors;

wherein, as the vehicle moves along the road, the control increases a value for each designated location when an object is detected at that designated location;

wherein, as the vehicle moves along the road, the control decreases the value for each designated location when an object is not detected at that designated location;

wherein, as the vehicle moves along the road, the control generates an object map based on values for the designated locations, and wherein the greater the value for a particular designated location, the greater the probability an object is present at that particular designated location; and wherein, responsive to the generated object map, the control determines an available parking space for parking the vehicle.

9. The vehicular control system of claim 8, wherein the control assigns an initial value to each designated location of the plurality of designated locations.

10. The vehicular control system of claim 8, wherein, responsive to determining distance between a detected object and a respective sensor based on sensor data from the respective sensor of the plurality of sensors, the control increases the value for each designated location that is the same distance from the respective sensor.

11. The vehicular control system of claim 10, wherein, responsive to increasing the value for each designated location that is the same distance from the respective sensor, the control decreases the value for each designated location that is closer to the respective sensor than the distance between the respective sensor and the detected object.

12. The vehicular control system of claim 8, wherein, responsive to receiving captured sensor data, the control updates the value at each designated location based on processing of the captured sensor data.

13. The vehicular control system of claim 8, wherein, responsive to the vehicle moving along the road for a threshold distance, the control updates the values at each designated location based on processing of the most recently captured sensor data.

14. The vehicular control system of claim 8, wherein, responsive to determination of an available parking space, the control generates control signals to control the vehicle to park the vehicle in the determined available parking space.

15. The vehicular control system of claim 8, wherein the plurality of sensors further comprises a plurality of lidar sensors.

* * * * *